(12) United States Patent
Matsuda et al.

(10) Patent No.: US 7,359,411 B2
(45) Date of Patent: Apr. 15, 2008

(54) FIBER LASER OSCILLATOR AND FIBER LASER PROCESSING APPARATUS

(75) Inventors: Yasushi Matsuda, Noda (JP); Hidenori Shimada, Noda (JP)

(73) Assignee: Miyachi Technos Corporation, a Japanese body corporate, Chiba-ken (JP)

( * ) Notice: Subject to any disclaimer, the term of this patent is extended or adjusted under 35 U.S.C. 154(b) by 0 days.

(21) Appl. No.: 11/723,932

(22) Filed: Mar. 22, 2007

(65) Prior Publication Data
US 2007/0230517 A1   Oct. 4, 2007

(30) Foreign Application Priority Data
Mar. 31, 2006   (JP)   ............................. 2006-099200

(51) Int. Cl.
*H01S 3/30* (2006.01)
*H01S 3/08* (2006.01)

(52) U.S. Cl. .............................. 372/6; 372/99; 372/101
(58) Field of Classification Search ................... 372/6, 372/99, 101
See application file for complete search history.

*Primary Examiner*—Armando Rodriguez
(74) *Attorney, Agent, or Firm*—Wenderoth, Lind & Ponack, L.L.P.

(57) ABSTRACT

An end cap is formed as a substantially cylindrical body having substantially the same diameter as an external diameter of a retaining unit of an oscillation fiber; a base end surface is integrally fusion-welded or fusion-bonded to one end surface of the oscillation fiber; and a leading end surface is obliquely cut relative to the light axis. A returning oscillating beam reflected by an optical resonator mirror is converged and made incident on a core end surface of the oscillation fiber 22 located at a focus position of an optical lens. However, since the core end surface is integrally bonded with the end cap and is not exposed to the atmosphere, the core end surface is not burned or deteriorated by the light energy of the oscillating beam.

12 Claims, 6 Drawing Sheets

FIBER LASER OSCILLATOR AND FIBER LASER PROCESSING APPARATUS

BACKGROUND OF THE INVENTION

1. Field of the Invention

The present invention relates to a fiber laser oscillator that uses an optical fiber to oscillate and output a laser beam and a laser processing apparatus that applies a laser beam to a workpiece to perform a desired laser process.

2. Description of the Related Art

Recently, a fiber laser processing apparatus is coming into practical use, which applies a laser beam generated by a fiber laser oscillator to a workpiece to perform a desired laser process.

Generally, in a fiber laser oscillator used in a fiber laser processing apparatus, an optical fiber for oscillation having a core doped with a rare-earth element is optically disposed between a pair of optical oscillator mirrors; the core of the optical fiber is optically excited; an oscillating beam with a predetermined wavelength axially comes out from an end surface of the core and is reciprocated many times between the optical oscillator mirrors to be oscillated and amplified; and a coherent laser beam is taken out from one optical oscillator mirror (partially reflective mirror or output mirror). Normally, an optical lens is disposed between the fiber end surface and the optical oscillator mirror, and the oscillating beam reflected by the optical oscillator mirror is narrowed (converged) by the optical lens and returned to the core end surface of the oscillation optical fiber. The oscillating beam coming out from the core end surface of the oscillation optical fiber is collimated by the optical lens and becomes parallel light made incident on the optical oscillator mirror. To optically excite the core of the oscillation optical fiber, a laser diode (LD) is used for an excitation light source and the LD end surface excitation mode is employed to allow LD light (excitation light) to be condensed and made incident on the core end surface through the optical oscillator mirror and the optical lens.

As compared to a typical solid laser oscillator using a block-shaped crystal for an active medium, the particularities (drawbacks and advantages) of the fiber laser oscillator exist in that the core of the optical fiber is used as an active medium. With regard to the drawbacks of the fiber laser oscillator, it is problematic that the end surface of the oscillation fiber easily burns out. That is, when the reflected light or returned light from the optical oscillator mirror is made incident on the end surface of the core with a diameter on the order of 10 μm, the power density is extremely high. Therefore, since the base material of the core, i.e., quartz glass has a damage threshold lower than crystals such as YAG, the end surface of the core tends to be burned by the energy of the incident light. Therefore, the laser oscillation in the optical oscillator itself causes burnout of the core end surface. In the laser processing apparatus, the reflected light from a processing point of a workpiece may be propagated through a laser emitting unit and a laser transmission system in the opposite direction and made incident on the end surface of the oscillation optical fiber, and the core end surface may also be burned out by such external light. If the core end surface of the oscillation optical fiber is burned out, the oscillation power of the fiber laser is reduced and the quality of the laser process is deteriorated.

SUMMARY OF THE INVENTION

The present invention was conceived in view of the above problems of the conventional technology and it is therefore an object of the present invention to provide a fiber laser oscillator that prevents burnout or deterioration of an active medium to improve stability of laser power.

It is another object of the present invention to provide a fiber laser processing apparatus that prevents burnout or deterioration of an active medium to achieve stability of laser power and to improve credibility of a laser process.

To achieve the above objects, a fiber laser oscillator of the present invention comprises an oscillation optical fiber that includes a core containing a light-emitting element; an optically transparent end cap bonded to an end surface of the oscillation optical fiber; a pair of optical oscillator mirrors optically opposed to each other through the oscillation optical fiber and the optical lens; and a fiber core exciting unit that excites the core of the oscillation optical fiber.

In the above configuration, an oscillating beam comes out on the light axis from an end surface of the core excited by the fiber core exciting unit and is reflected by the optical resonator mirror and returned to the core end surface. In this situation, the returning oscillating beam from the optical resonator mirror is made incident on the end cap from the atmosphere and is made incident on the core from the boundary surface between the end cap and the core. Since the core end surface is bonded with the end cap and is not exposed to the atmosphere, the core end surface is not burned or deteriorated by the incident power of the returning oscillating beam.

Especially, in a configuration with a pair of optical lenses located at a focal distance from the both ends of the oscillation optical fiber, since the returning oscillating beam from the optical resonator mirror is converged and made incident on the end surface of the core through the optical lens, no burnout is generated on the end surface of the core because of the protective function of the above end cap. Since the leading end surface of the end cap is located significantly closer to the optical lens than the focus, when the returning oscillating beam is made incident on the leading end surface of the end cap from the atmosphere, the beam diameter or area is fairly large and the power density is accordingly low, and therefore, no burnout is generated on the end cap.

According to a preferred aspect of the present invention, since the material of the end cap is synthetic quartz, the bondability with the oscillation optical fiber can be improved and the laser resistance of the end cap itself can be enhanced.

According to a preferred aspect of the present invention, the end cap is fusion-welded to the end surface of the oscillation optical fiber. The end cap is integrated with the core by the bonding in the fusion-welded form and the reflection at the boundary surface is reduced. Preferably, the shape of the end cap is cylindrical. In this case, it is preferable from a standpoint of the fusion-welding process or maximum incident angle that the diameter of the end cap is substantially equal to or greater than the external diameter of the oscillation optical fiber.

According to a preferred aspect, the leading end surface of the end cap is obliquely cut relative to the light axis. In such a configuration, the reflected light is generated by a boundary surface between the leading end surface of the end cap and the atmosphere and is obliquely deviated from the light axis, and undesired oscillation and amplification generating undesired laser beams do not occur.

According to a preferred aspect of the present invention, the oscillation optical fiber includes a clad surrounding the core, an air layer surrounding the clad, and a retaining unit surrounding and retaining the air layer. In such a fiber configuration, the numerical aperture to the excitation light can be considerably increased in the end surface excitation mode, and the excitation light can be supplied to the oscillation optical fiber through highly efficient coupling to easily and simply realize higher power of the fiber laser beam.

A fiber laser processing apparatus of the present invention comprises the fiber laser oscillator of the present invention and a laser emitting unit that condenses and applies a laser beam output from the fiber laser oscillator to a processing point of a workpiece. In a preferred aspect, a transmission optical fiber is used for transmitting the laser beam output from the fiber laser oscillator to the laser emitting unit.

The fiber laser oscillator of the present invention can prevent burnout or deterioration of an active medium to improve stability of laser power with the above configurations and effects. The fiber laser processing apparatus of the present invention can prevent burnout or deterioration of an active medium to achieve stability of laser power and to improve credibility of a laser process with the above configurations and effects.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Preferred embodiments of the present invention will hereinafter be described with reference to the accompanying drawings.

Figure 1:
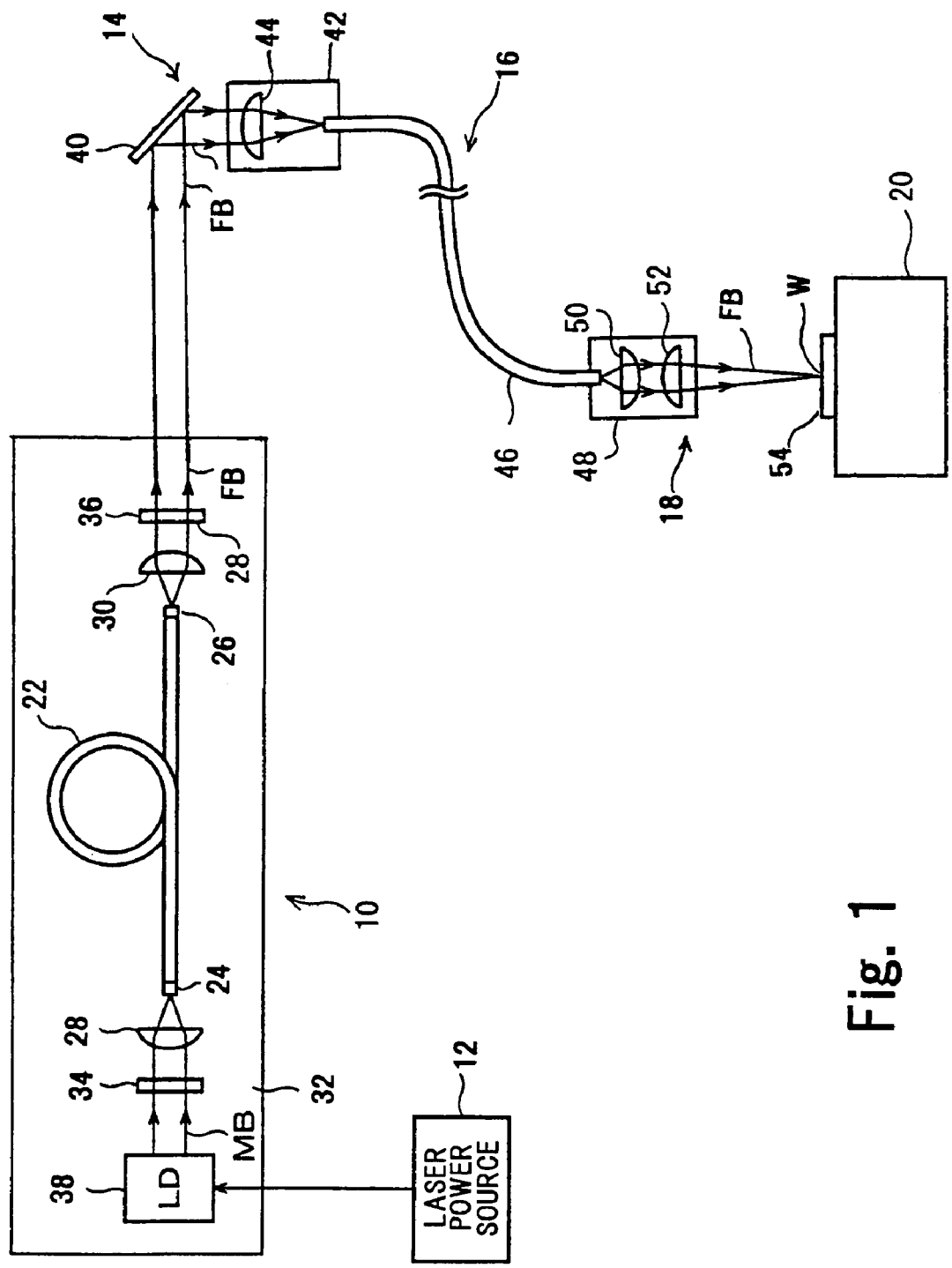
FIG. 1 depicts a configuration of a fiber laser processing apparatus according to one embodiment of the present invention.

FIG. 1 depicts a configuration of a fiber laser processing apparatus according to one embodiment of the present invention. This fiber laser processing apparatus is configured by a fiber laser oscillator 10, a laser power source 12, a laser incident unit 14, a fiber transmission system 16, a laser emitting unit 18, a processing table 20, etc.

The fiber laser oscillator 10 includes an optical fiber for oscillation (hereinafter, "oscillation fiber") 22, a pair of end caps 24 and 26 bonded to both end surfaces of the oscillation fiber 22, optical lenses 28 and 30 located at a focal distance from the both ends of the oscillation fiber 22, an electro-optic exciting unit 32 that applies pumping excitation light MB to one end surface of the oscillation fiber 22, and a pair of optically opposing optical resonator mirrors 34 and 36.

The electro-optic exciting unit 32 includes a laser diode (LD) 38 and the optical lens 28. The LD 38 is driven by an excitation current from the laser power source 12 to emit light and oscillates and outputs an excitation laser beam MB. The excitation laser beam MB from the LD 38 is converged by the optical lens 28 and made incident on one end surface of the oscillation optical fiber 22 through the end cap 24. The optical resonator mirror 34 is disposed between the LD 38 and the optical lens 28 and is coated with a film permeable to the wavelength of the excitation laser beam MB from the LD 38.

The oscillation fiber 22 has a core doped with a predetermined light-emitting element and a clad coaxially surrounding the core; the core is used as an active medium; and the clad is used as a propagation light path of the excitation light. The excitation light MB is made incident on one end surface of the oscillation fiber 22 as above, is axially propagated through the oscillation fiber 22 while confined by the total reflection on the outer circumferential surface of the clad, and passes through the core many times during the propagation to optically excite the light-emitting element in the core. In this way, an oscillating beam with a predetermined wavelength is axially emitted from both ends of the core; this oscillating beam is reciprocated many times between the optical oscillator mirrors 26 and 28 to be oscillated and amplified; and a fiber laser beam FB with a predetermined wavelength is taken out from the one optical resonator mirror 36 consisting of a partially reflective mirror.

The optical lenses 28 and 30 collimates the oscillating beam emitted from the end surface of the oscillation fiber 22 into parallel light, transmits the light through the optical resonator mirrors 34 and 36, and converges the oscillating beam reflected and returned from the optical resonator mirrors 34 and 36 onto the end surface of the oscillation fiber 22.

The fiber laser beam FB output from the fiber laser oscillator 10 enters into the laser incident unit 14 as above. In the laser incident unit 14, after the light path is bent to a predetermined direction by a bent mirror 40, the fiber laser beam FB enters into an incident unit 42 and is converged and made incident on one end surface of a transmission optical fiber (hereinafter, "transmission fiber") 46 of the fiber transmission system 16 through a converging lens 44 in the unit. The transmission fiber 46 is, for example, a SI (step-index) fiber and transmits the fiber laser beam FB made incident in the incident unit 42 to an emitting unit 48 of the laser emitting unit 18.

The emitting unit 48 includes a collimator lens 50 that collimates the fiber laser beam FB coming out from the transmission fiber 46 into parallel light, and a converging lens 52 that converges the parallel fiber laser beam FB at a predetermined focus position, and converges and makes the fiber laser beam FB incident on a processing point W of a workpiece 54 placed on the processing table 20.

In the case of laser welding, when the laser power source 12 supplies an excitation current having a pulse waveform to the LD 30, the excitation light MB having a pulse waveform is supplied from the LD 30 to the oscillation fiber 22 in the fiber laser oscillator 10, and the fiber laser oscillator 10 oscillates and outputs a fiber laser beam FM having a pulse waveform. The fiber laser beam FM having a pulse waveform is converged and made incident on the processing point W of the workpiece 54 through the laser incident unit 14, the fiber transmission system 16, and the laser emitting unit 18. At the processing point W, the processed material is melted by the energy of the fiber laser beam FM having a pulse waveform and is solidified to form a nugget after the pulsed application.

In this fiber laser processing apparatus, since the active medium is the elongated core having a diameter on the order of 10 μm and a length on the order of a few meters in the oscillation fiber 22, the fiber laser oscillator 10 can oscillate and output the fiber laser beam MB with a small beam diameter and small beam spread angle. Since the excitation light MB made incident on one end surface of the oscillation fiber 22 passes through the core many times during the propagation through the long light path of a few meters to exhaust the excitation energy, the fiber laser beam FB can be with high oscillation efficiency. Since the core of the oscillation fiber 22 does not cause the thermal lens effect, a beam mode is very stable in the fiber laser oscillator 10.

Since this fiber laser processing apparatus employs the LD end surface excitation mode, the excitation mechanism is simple and small, and each unit (especially, around LD 38) can easily be maintained and repaired. Since optical coupling efficiency is considerably improved between the LD 38 and the oscillation fiber 22 as described later, the high-power fiber laser beam FB can easily be acquired which is suitable for the laser welding process requiring high energy.

Figure 2:
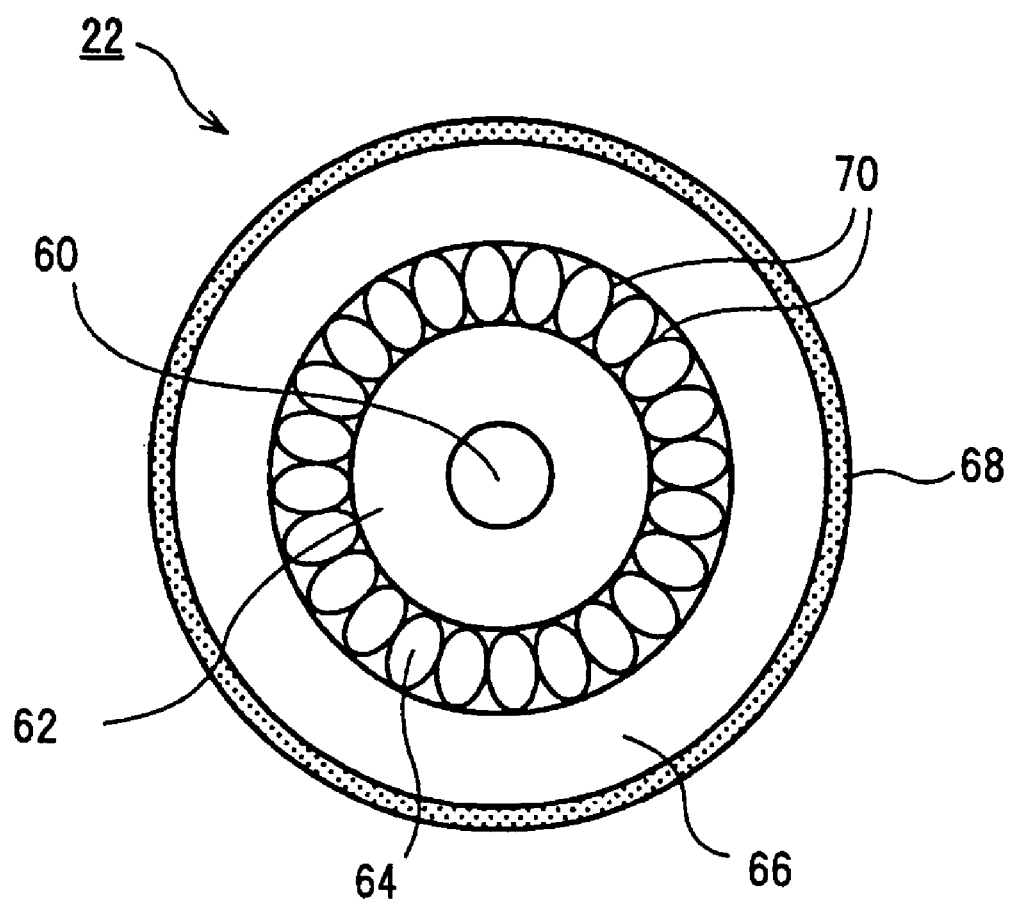
FIG. 2 is a sectional view of a configuration of an oscillation optical fiber included in a fiber laser oscillator of the embodiment.

FIG. 2 is a sectional view of a configuration of the oscillation fiber 22 of the embodiment. As shown, the oscillation fiber 22 includes a core 60 extending through the central axis, a clad 62 coaxially surrounding the core 60, an air layer 64 surrounding the clad 62, a retaining unit 66 surrounding and retaining the air layer 64, and a coating 68 surrounding the retaining unit 66.

The core 60 is made of quartz glass doped with a rare-earth element ion such as $Nd^{3+}$; the clad 62 is made of quartz glass; the retaining unit 66 is made of multi-component glass or resin, for example; and the coating 68 is made of resin. The air layer 64 is configured by closely and circumferentially arranging hollow fibers 70 made of a material, such as quartz glass, having a refractive index identical or close to that of the clad 60, and the hollow fibers (quartz glass) 70 are fusion-welded to the clad (quartz glass) 62. The both ends of the hollow fibers 70 are closed to shield the inside air from the outside air. The gas enclosed in the hollow fibers 70 may be $N_2$ gas, etc.

Figure 3:
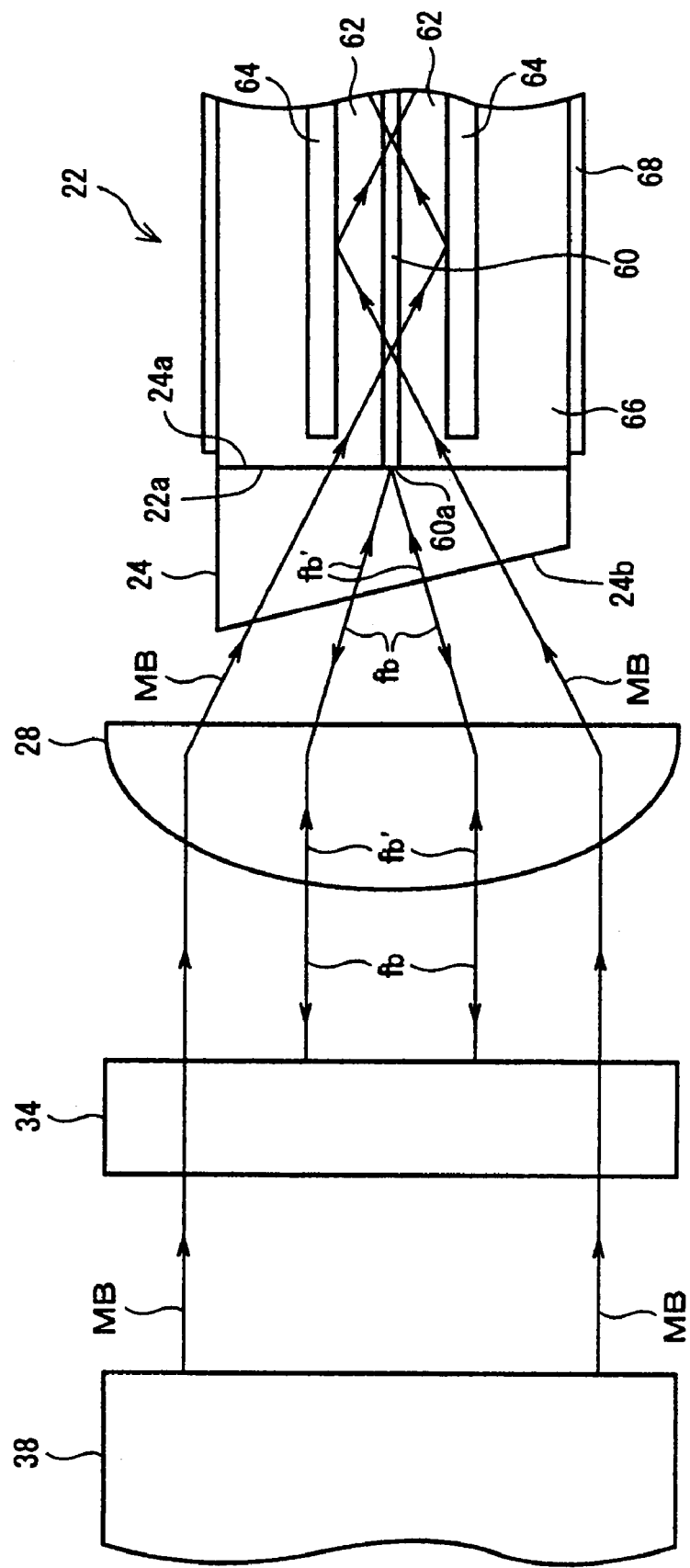
FIG. 3 is a side view of a configuration around one end of the oscillation optical fiber in the embodiment.
Figure 4:
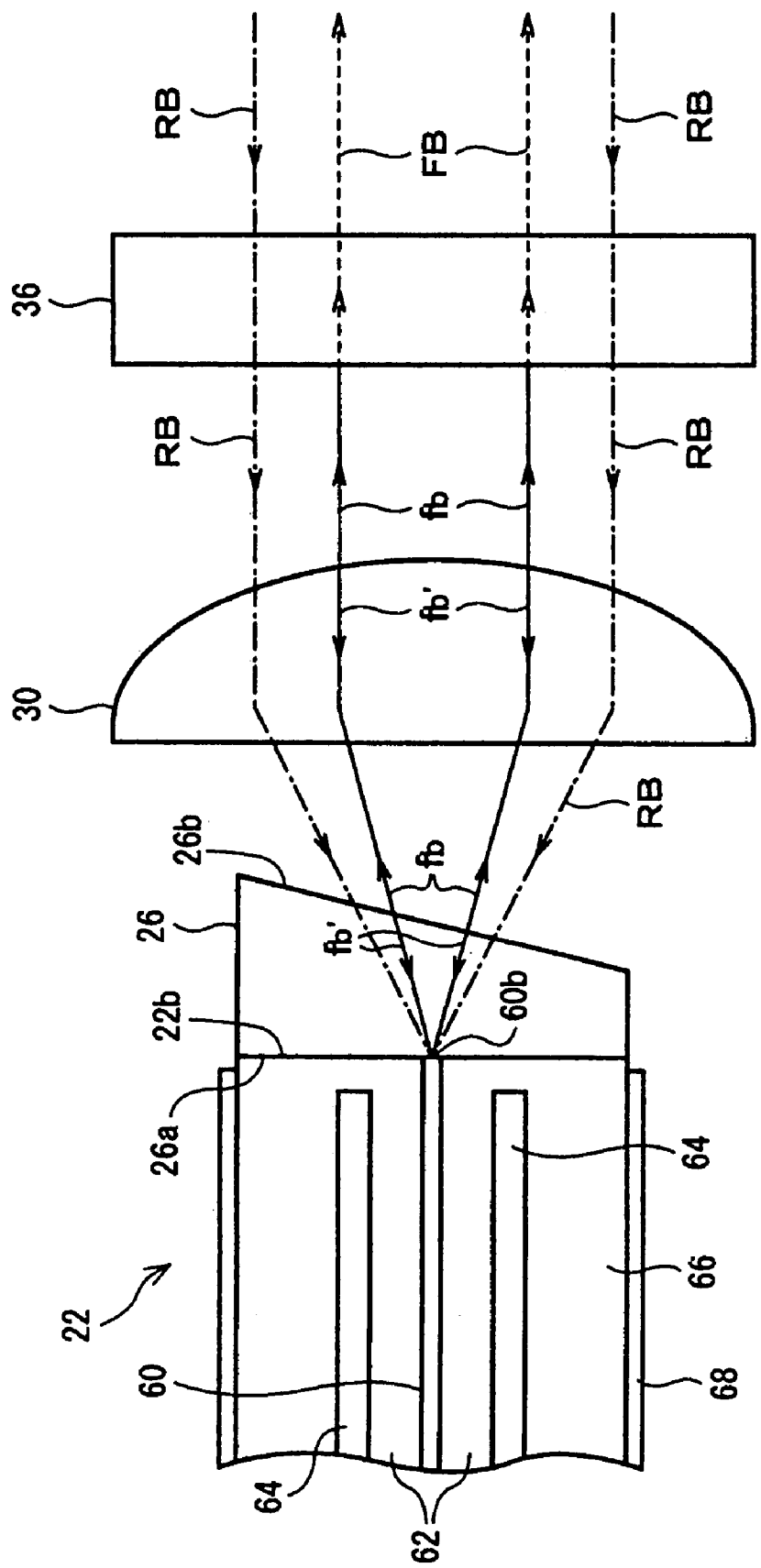
FIG. 4 is a side view of a configuration around the other end of the oscillation optical fiber in the embodiment.

FIGS. 3 and 4 depict configurations around the both ends of the oscillation fiber 22, especially, configurations of the end caps 24 and 26, respectively.

As shown in FIG. 3, the one end cap 24 is formed as a substantially cylindrical body having substantially the same diameter as the external diameter of the retaining unit 66 of the oscillation fiber 22; a base end surface 24a is integrally fusion-welded or fusion-bonded to one end surface 22a of the oscillation fiber 22; and a leading end surface 24b is obliquely cut relative to the light axis. The material of the end cap 24 preferably is transparent, has high laser resistance, and has excellent fusion-weldability with the base material (quartz glass) of the oscillation fiber 22 and, for example, synthetic quartz can appropriately be used. If the end cap 24 has substantially the same width as the oscillation fiber 22, no step is substantially created at the bonded surface when both are aligned, and therefore, fusion welding can be performed with excellent uniformity and bondability by uniformly heating the circumference.

The excitation laser beam MB from the LD 38 is transmitted straight through the optical resonator mirror 34, converged by the optical lens 28, is made incident on the oscillation fiber 22 in a defocus state, is totally and repeatedly reflected by the boundary surface of the clad 62 and the air layer 64, and is axially propagated through the clad 62. The numerical aperture NA of the oscillation fiber 22 to the excitation light MB is determined by the refractive index of the clad 62 and the refractive index of the air layer 64 and, since the refractive index of the air layer 64 is the minimum value of one, the numerical aperture NA is about 0.55, which is higher than a numerical aperture of a conventional general double clad fiber (DCF) (about 0.45) by about 20%. As a result, the optical coupling efficiency is considerably improved in the LD end surface excitation mode, and higher power can be achieved in the fiber laser beam FB.

An oscillating beam fb comes out with a constant spread angle on the light axis from one end surface 60a of the core 60 of the oscillating fiber 22, is collimated by the optical lens 28, and is reflected and returned by the subsequent optical resonator mirror 34 to the opposite axial direction. A returning oscillating beam fb' reflected by the optical resonator mirror 34 is made incident on the back side or rear side of the optical lens 28, is converged by the optical lens 28, is transmitted through the end cap 24, and is converged and made incident on the end surface 60a of the core 60. Although not shown, the oscillating beam fb' entering the core 60 is totally and repeatedly reflected by the boundary surface of the core 60 and the clad 62 and is axially propagated through the core 60.

In this way, the returning oscillating beam fb' reflected by the optical resonator mirror 34 is converged and made incident on the core end surface 60a of the oscillation fiber 22 located at the focus position of the optical lens 28. However, since the core end surface 60a is integrally bonded with the end cap 24 and is not exposed to the atmosphere, the core end surface 60a is not burned or deteriorated by the light energy of the oscillating beam fb'. On the other hand, since the leading end surface 24b of the end cap 24 is located significantly closer to the optical lens 28 than the focus, when the returning oscillating beam fb' is made incident on the leading end surface 24b of the end cap 24 from the atmosphere, the beam diameter or area is fairly large and the power density is accordingly low. Synthetic quartz having high laser resistance is used for the material of the end cap 24. Therefore, the leading end surface 24b of the end cap 24 is also not burned by the light energy of the returning oscillating beam fb'.

Since the leading end surface 24b of the end cap 24 is obliquely cut relative to the light axis, the reflected light generated at the boundary surface between the end cap leading end surface 24b and the atmosphere (especially, the reflected light returning to the fiber end surface 22a) is obliquely deviated from the light axis and undesired oscillation and amplification do not occur.

The opposite end cap 26 has the same configuration as the above end cap 24 and achieves the same effect. That is, the end cap 26 is formed as a substantially cylindrical body having substantially the same diameter as the external diameter of the retaining unit 66 of the oscillation fiber 22; a base end surface 26a is integrally fusion-welded or fusion-bonded to the other end surface 22b of the oscillation fiber 22; and a leading end surface 26b is obliquely cut relative to the light axis. Synthetic quartz can also appropriately be used for the material of the end cap 26.

The oscillating beam fb comes out with a constant spread angle on the light axis from an end surface 60b of the core 60 of the oscillating fiber 22, is collimated by the optical lens 30, and is reflected and returned by the subsequent resonator mirror 36 to the opposite axial direction. A portion of the oscillating beam fb gets out of the optical resonator mirror 36 as the fiber laser beam FB. The returning oscillating beam fb' reflected by the optical resonator mirror 36 is made incident on the back side or rear side of the optical lens 30, is converged by the optical lens 30, is transmitted through the end cap 26, and is converged and made incident on the end surface 60b of the core 60. Although not shown, the oscillating beam fb' entering the core 60 is totally and repeatedly reflected by the boundary surface of the core 60 and the clad 62 and is axially propagated through the core 60.

On the other end of the fiber, the returning oscillating beam fb' reflected by the optical resonator mirror 36 also is converged and made incident on the core end surface 60b of the oscillation fiber 22 located at the focus position of the optical lens 30. However, since the core end surface 60b is integrally bonded with the end cap 26 and is not exposed to the atmosphere, the core end surface 60b is not burned by the light energy of the oscillating beam fb'. On the other hand, since the leading end surface 26b of the end cap 26 is located significantly closer to the optical lens 30 than the focus, when the returning oscillating beam fb' is made incident on the leading end surface 26b of the end cap 26 from the atmosphere, the beam diameter or area is fairly large and the power density is accordingly low. Synthetic quartz having high laser resistance is used for the material of the end cap 26. Therefore, the leading end surface 26b of the end cap 26 is also not burned or deteriorated due to the incident of the returning oscillating beam fb'.

Since the leading end surface 26b of the end cap 26 is obliquely cut relative to the light axis, the reflected light generated at the boundary surface between the core end surface 60b and the atmosphere (especially, the reflected light returning to the fiber end surface 22b) is obliquely deviated from the light axis and undesired oscillation and amplification do not occur.

Although not shown, the excitation light MB is made incident on the one end surface 22a of the oscillation fiber 22 as above, exhausts almost all the light energy in the oscillation fiber 22, and comes out from the opposite fiber end surface 22b with light intensity considerably attenuated. To laterally deviate the used excitation light MB after passing through the oscillation fiber 22, a turn-back mirror may obliquely be disposed on the subsequent stage of the optical resonator mirror (output mirror) 36, for example.

In this fiber laser processing apparatus, reflected light RB from the processing point W of the workpiece 54 may be propagated through the laser emitting unit 18, the fiber transmission system 16, the laser incident unit 14, the optical resonator mirror (output mirror) 36, and the optical lens 36 and made incident on the end surface 22b of the oscillation fiber 22. In this case, if the reflected light RB is condensed and made incident on the core end surface 60b, since the protective function of the end cap 26 works with the same effect as above, the core end surface 60b is in no danger of being burned/deteriorated, and the end cap 26 also is not burned/deteriorated.

Although the preferred embodiment of the present invention has been described, the above embodiment does not limit the present invention. Those skilled in the art can make various modifications and changes without departing from the technical concept and the technical scope of the present invention in specific embodiments.

Figure 5:
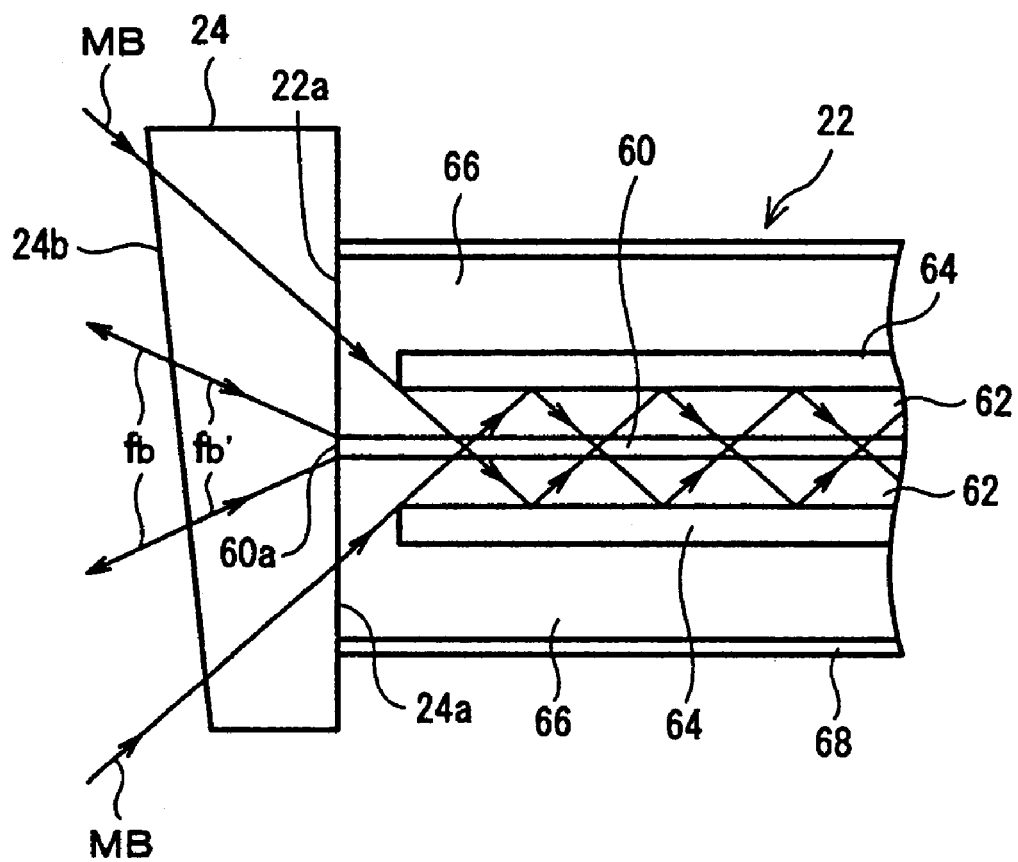
FIG. 5 is a side view of a configuration of an end cap according to one variation of the embodiment.

For example, as shown in FIG. 5, the external diameter of the end cap 24 can be larger that the external diameter of the oscillation fiber 22 on the LD end surface excitation side, and this configuration is advantageous for the oscillation fiber 22 to take in the excitation light MB from the LD 38 (FIGS. 1 and 3) at the maximum light receiving angle.

Figure 6:
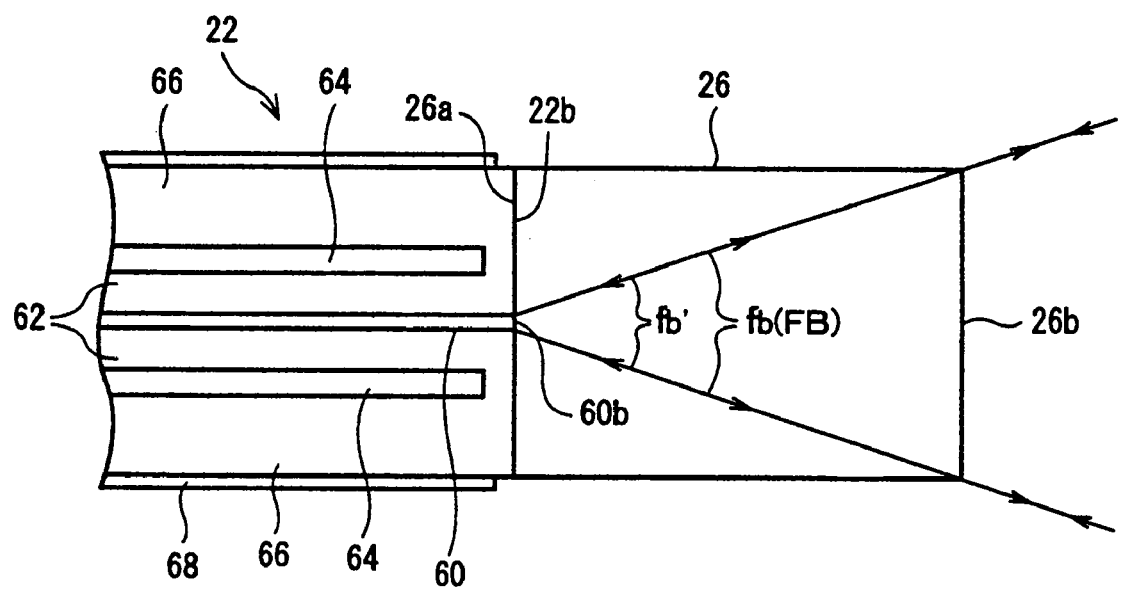
FIG. 6 is a side view of a configuration of an end cap according to another variation.

As shown in FIG. 6, on the fiber laser output side, the end cap 26 can axially be extended to sufficiently enlarge the incident beam spot diameter when the returning oscillating beam fb' reflected by the optical oscillator mirror 36 is made incident on the end cap 26. In this case, as shown, the maximum incident beam spot diameter is achieved when the diameter is equivalent to the external diameter of the end cap 26. As shown in the example of FIG. 6, the leading end surface 26b (24b) of the end cap 26 (24) can be cut perpendicularly to the light axis.

In the above embodiment, the fiber laser oscillator 10 and the laser emitting unit 18 are optically connected through the fiber transmission system 16 (transmission fiber 46). However, the fiber laser beam FB oscillated and output from the fiber laser oscillator 10 can be sent directly or through a bent mirror, etc., to the laser emitting unit 18 in a mode or configuration not using the fiber transmission system 16.

The oscillation fiber 22, the electro-optic exciting unit 32, the optical resonator mirrors 34 and 36, the optical lenses 28 and 30, etc., can be modified or partially omitted in the fiber laser oscillator 10, and other configurations achieving the same functions or effects can be used. For example, a double clad fiber (DCF) can be used for the oscillation fiber 22. Although the excitation light is applied to one end surface 22a (closer to the total reflection mirror 34) of the oscillation fiber 22 in the above embodiment, a mode of applying the excitation light to the opposite end surface 22b (closer to the output mirror 36) of the oscillation fiber 22 can also be used, or a double-sided excitation mode can also be used to apply the excitation light to the both end surfaces 22a and 22b at the same time. A Q-switch can be disposed in the fiber laser oscillator 10 to generate a Q-switched pulse fiber laser beam.

The fiber laser processing apparatus of the present invention is not limited to laser welding and is applicable to laser processes such as laser marking, boring, cutting, etc.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A fiber laser oscillator comprising:
   at least one optical lens;
   an oscillation optical fiber that includes a core containing a light-emitting element;
   an optically transparent end cap bonded to an end surface of the oscillation optical fiber;
   a pair of optical oscillator mirrors optically opposed to each other through the oscillation optical fiber and the at least one optical lens; and
   a fiber core exciting unit for exciting the core of the oscillation optical fiber.

2. The fiber laser oscillator of claim 1, wherein the end cap is fusion-welded to the end surface of the oscillation optical fiber.

3. The fiber laser oscillator of claim 1, wherein the end cap is cylindrically formed.

4. The fiber laser oscillator of claim 3, wherein the end cap has a diameter substantially equivalent to the external diameter of the oscillation optical fiber.

5. The fiber laser oscillator of claim 3, wherein the end cap has a diameter larger than the external diameter of the oscillation optical fiber.

6. The fiber laser oscillator of claim 1, wherein the leading end surface of the end cap is obliquely cut relative to the light axis.

7. The fiber laser oscillator of claim 1, wherein the end caps is made of synthetic quartz.

8. The fiber laser oscillator of claim 1, wherein the oscillation optical fiber includes a clad surrounding the core, an air layer surrounding the clad, and a retaining unit surrounding and retaining the air layer.

9. The fiber laser oscillator of claim 1, comprising a pair of optical lenses located at a focal distance from the both ends of the oscillation optical fiber, wherein said pair of optical oscillator mirrors are optically opposed to each other through the oscillation optical fiber and said pair of optical lenses.

10. The fiber laser oscillator of claim 1, wherein the fiber core exciting unit includes an excitation light source that generates excitation light for exciting the core of the oscillation optical fiber and wherein the excitation light generated by the excitation light source is condensed and made incident on the end surface of the oscillation optical fiber through one of the at least one optical lens.

11. A fiber laser processing apparatus comprising:
   a fiber laser oscillator, said fiber laser oscillator comprising at least one optical lens, an oscillation optical fiber that includes a core containing a light-emitting element, an optically transparent end cap bonded to an end surface of the oscillation optical fiber, a pair of optical oscillator mirrors optically opposed to each other through the oscillation optical fiber and the at least one optical lens, and a fiber core exciting unit that excites the core of the oscillation optical fiber; and
   a laser emitting unit that condenses and applies a laser beam output from the fiber laser oscillator to a processing point of a workpiece.

12. The fiber laser processing apparatus of claim 11, comprising a transmission optical fiber for transmitting the laser beam output from the fiber laser oscillator to the laser emitting unit.

* * * * *